United States Patent
Miao et al.

(10) Patent No.: US 11,409,983 B2
(45) Date of Patent: Aug. 9, 2022

(54) METHODS AND APPARATUSES FOR DYNAMICALLY ADDING FACIAL IMAGES INTO DATABASE, ELECTRONIC DEVICES AND MEDIA

(71) Applicant: BEIJING SENSETIME TECHNOLOGY DEVELOPMENT CO., LTD, Beijing (CN)

(72) Inventors: Wenjian Miao, Beijing (CN); Qian Chen, Beijing (CN); Duanguang Shi, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 132 days.

(21) Appl. No.: 16/413,611

(22) Filed: May 16, 2019

(65) Prior Publication Data

US 2019/0272415 A1    Sep. 5, 2019

Related U.S. Application Data

(63) Continuation of application No. PCT/CN2018/096540, filed on Jul. 20, 2018.

(30) Foreign Application Priority Data

Jul. 21, 2017  (CN) .......................... 201710605539.3
Jan. 16, 2018  (CN) .......................... 201810041796.3
Jan. 16, 2018  (CN) .......................... 201810041797.8

(51) Int. Cl.
*G06K 9/62*    (2022.01)
*G06F 16/535*  (2019.01)
(Continued)

(52) U.S. Cl.
CPC ....... *G06K 9/6215* (2013.01); *G06F 16/1748* (2019.01); *G06F 16/51* (2019.01);
(Continued)

(58) Field of Classification Search
USPC ........................................... 382/118
See application file for complete search history.

(56) References Cited

U.S. PATENT DOCUMENTS 6,549,914 B1    4/2003  Valys
8,705,813 B2 *  4/2014  Matsuyama ....... G06K 9/00295
                                                  382/118
(Continued)

FOREIGN PATENT DOCUMENTS

CN    102799877 A   11/2012
CN    102880726 A    1/2013
(Continued)

OTHER PUBLICATIONS

First Office Action of the Japanese application No. 2019-553920, dated Oct. 13, 2020.
(Continued)

*Primary Examiner* — Ishrat I Sherali
(74) *Attorney, Agent, or Firm* — Syncoda LLC; Feng Ma

(57) ABSTRACT

Methods and apparatuses for dynamically adding facial images into a database, electronic devices, media and programs include: comparing an obtained first facial image with pre-stored facial image information in an image database; and in response to a comparison result indicating that the first facial image has no matched pre-stored facial image information in the image database, determining whether to store at least one of the first facial image and feature information of the first facial image in the image database. Control of dynamically adding facial images into the database can therefore be achieved.

14 Claims, 4 Drawing Sheets

(51) Int. Cl.
*G06F 16/174* (2019.01)
*G06F 16/583* (2019.01)
*G06F 16/51* (2019.01)
*G06V 20/40* (2022.01)
*G06V 40/50* (2022.01)
*G06V 40/16* (2022.01)

(52) U.S. Cl.
CPC .......... *G06F 16/535* (2019.01); *G06F 16/583* (2019.01); *G06V 20/46* (2022.01); *G06V 40/172* (2022.01); *G06V 40/173* (2022.01); *G06V 40/50* (2022.01)

(56) References Cited

U.S. PATENT DOCUMENTS

| | | | |
|---|---|---|---|
| 9,230,157 | B2 | 1/2016 | Bataller |
| 9,298,976 | B2 | 3/2016 | Je |
| 9,384,518 | B2 | 7/2016 | Chung |
| 10,032,076 | B2* | 7/2018 | Zhang ................ G06K 9/00624 |
| 10,083,368 | B2* | 9/2018 | Krishnamoorthi ... G06K 9/4671 |
| 10,438,056 | B2* | 10/2019 | Liang ...................... G06K 9/00 |
| 2008/0112598 | A1* | 5/2008 | Gabara ................... G10L 17/00 382/116 |
| 2011/0311112 | A1* | 12/2011 | Matsuyama ....... G06K 9/00281 382/118 |
| 2013/0195316 | A1* | 8/2013 | Bataller ............... G06K 9/6255 382/103 |
| 2013/0246790 | A1 | 9/2013 | Wang |
| 2013/0246811 | A1 | 9/2013 | Wang |
| 2013/0251214 | A1* | 9/2013 | Chung ............... G06K 9/00161 382/116 |
| 2013/0336590 | A1* | 12/2013 | Sentinelli .............. G06F 16/739 382/218 |
| 2014/0075193 | A1 | 3/2014 | Wang |
| 2014/0198986 | A1 | 7/2014 | Marchesotti |
| 2014/0226877 | A1* | 8/2014 | Je ...................... G06K 9/00926 382/118 |
| 2015/0088625 | A1* | 3/2015 | Eronen ................. G06Q 50/01 705/14.16 |
| 2016/0224824 | A1 | 8/2016 | Yamada et al. |
| 2019/0266441 | A1* | 8/2019 | Miao .................... G06F 16/583 |

FOREIGN PATENT DOCUMENTS

| | | |
|---|---|---|
| CN | 103237040 A | 8/2013 |
| CN | 103793697 A | 5/2014 |
| CN | 103824053 A | 5/2014 |
| CN | 103984738 A | 8/2014 |
| CN | 104166694 A | 11/2014 |
| CN | 104679913 A | 6/2015 |
| CN | 105243373 A | 1/2016 |
| CN | 105513101 A | 4/2016 |
| CN | 105701466 A | 6/2016 |
| CN | 105760461 A | 7/2016 |
| CN | 106204779 A | 12/2016 |
| CN | 106570110 A | 4/2017 |
| CN | 106570465 A | 4/2017 |
| CN | 108228871 A | 6/2018 |
| CN | 108228872 A | 6/2018 |
| JP | 2007102341 A | 4/2007 |
| JP | 2007102342 A | 4/2007 |
| JP | 2010003021 A | 1/2010 |
| JP | 2010055594 A | 3/2010 |
| JP | 2010218059 A | 9/2010 |
| JP | 2015222582 A | 12/2015 |
| WO | 2008072622 A1 | 6/2008 |
| WO | 2017016146 A1 | 2/2017 |

OTHER PUBLICATIONS

First Office Action of the Japanese application No. 2019-553912, dated Nov. 10, 2020.
English Translation of the Written Opinion of the International Search Authority in the international application No. PCT CN2018/096542, dated Oct. 18, 2018.
English Translation of the Written Opinion of the International Search Authority in the international application No. PCT CN2018/096540, dated Oct. 18, 2018.
International Search Report in the international application No. PCT/CN2018/096542, dated Oct. 18, 2018.
International Search Report in the international application No. PCT/CN2018/096540, dated Oct. 18, 2018.
Notice of Allowance of U.S. Appl. No. 16/412,854, dated Jun. 4, 2021.
First Office Action of the U.S. Appl. No. 16/412,854, dated Feb. 19, 2021.
Written Opinion of the Singaporean application No. 11201909069Q, dated Oct. 12, 2021.

* cited by examiner

METHODS AND APPARATUSES FOR DYNAMICALLY ADDING FACIAL IMAGES INTO DATABASE, ELECTRONIC DEVICES AND MEDIA

CROSS-REFERENCE TO RELATED APPLICATIONS

This application is a continuation of, and claims priority to, International Patent Application No. PCT/CN2018/096540 filed on Jul. 20, 2018, which claims priority to Chinese Patent Application No. 201710605539.3 filed on Jul. 21, 2017 and entitled "METHODS AND APPARATUSES FOR ADDING FACIAL IMAGES INTO DATABASE, ELECTRONIC DEVICES, AND COMPUTER STORAGE MEDIA," Chinese Patent Application No. 201810041796.3 filed on Jan. 16, 2018 and entitled "METHODS AND APPARATUSES FOR DYNAMICALLY ADDING FACIAL IMAGES INTO DATABASE, ELECTRONIC DEVICES, MEDIA AND PROGRAMS," and Chinese Patent Application No. 201810041797.8 filed on Jan. 16, 2018 and entitled "METHODS AND APPARATUSES FOR REMOVING DUPLICATED FACIAL IMAGES, ELECTRONIC DEVICES, STORAGE MEDIA AND PROGRAMS." The disclosures of these applications are incorporated herein by reference in their entirety.

BACKGROUND

With the continuous upgrade of consumption, demand personalization and scenario experiencing will become the key element of the retail mode, and consumers not only pay for the product itself, but also for scenario elements such as the shopping experience, environment, and personalized service.

Face search is a method of searching a known face standard library for a corresponding facial image based on a known face database. Generally, a fixed total number of standard photos are stored in the face standard library, and the standard photo is a picture that serves as a reference face when the system performs face search or comparison.

SUMMARY

The present disclosure relates to computer vision technologies, and in particular, to methods and apparatuses for dynamically adding facial images into a database, electronic devices and media.

Embodiments of the present disclosure provide technologies for dynamically adding facial images into a database.

According to an aspect of one or more embodiments of the present disclosure, provided is a method for dynamically adding facial images into a database, including: comparing an obtained first facial image with pre-stored facial image information in an image database; and in response to a comparison result indicating that the first facial image is not matched with any one piece of the pre-stored facial image information in the image database, determining whether to store at least one of the first facial image or feature information of the first facial image into the image database.

According to another aspect of the embodiments of the present application, provided is an apparatus for dynamically adding facial images into a database, including a comparison unit and a storage unit. The comparison unit is configured to compare an obtained first facial image with pre-stored facial image information in an image database. The storage unit is configured to determine, in response to a comparison result indicating that the first facial image is not matched with any one piece of the pre-stored facial image information in the image database, whether to store at least one of the first facial image or feature information of the first facial image into the image database.

According to another aspect of the embodiments of the present application, provided is an electronic device, including a processor, where the processor includes the apparatus for dynamically adding facial images into a database as stated above.

According to another aspect of the embodiments of the present application, provided is an electronic device, including a processor and a memory for storing instructions executable by the processor. Execution of the instructions by the processor causes the processor to perform the following operations: comparing an obtained first facial image with pre-stored facial image information in an image database; and in response to a comparison result indicating that the first facial image is not matched with any one piece of the pre-stored facial image information in the image database, determining whether to store at least one of the first facial image or feature information of the first facial image into the image database.

According to another aspect of the embodiments of the present application, provided is a non-transitory computer storage medium, configured to store computer-readable instructions, where execution of the instructions by the processor causes the processor to perform the following operations: comparing an obtained first facial image with pre-stored facial image information in an image database; and in response to a comparison result indicating that the first facial image is not matched with any one piece of the pre-stored facial image information in the image database, determining whether to store at least one of the first facial image or feature information of the first facial image into the image database.

According to another aspect of the embodiments of the present application, provided is a computer program, including computer-readable codes, where when the computer-readable codes run in a device, a processor in the device executes instructions for implementing the method for dynamically adding facial images into a database as stated above.

Based on the methods and apparatuses for dynamically adding facial images into a database, electronic devices, media and programs provided by embodiments of the present application, the obtained first facial image is compared with pre-stored facial image information in the image database, and if the first facial image has no matched pre-stored facial image information in the image database, it is indicated that the first facial image is likely to occur for the first time or is previously deleted from the image database. In this case, in response to the comparison result indicating that the first facial image has no matched pre-stored facial image information in the image database, it is determined whether the first facial image and/or the feature information of the first facial image is stored in the image database, thereby facilitating dynamically storing the facial image and/or the feature information of the facial image in the database.

The technical solutions of the present application are further described below in detail with reference to the accompanying drawings and embodiments.

BRIEF DESCRIPTION OF DRAWINGS

The accompanying drawings constituting a part of the specification are used for describing embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
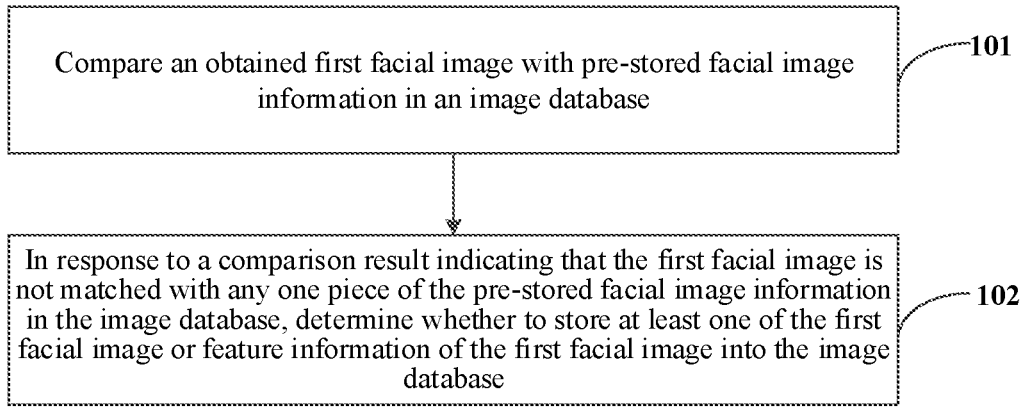
FIG. 1 illustrates a flowchart of one or more embodiments of a method for dynamically adding facial images into a database according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are in fact merely illustrative, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in one accompanying drawing, the item does not need to be further discussed in the subsequent accompanying drawings.

Embodiments of the present disclosure are applied to computer systems/servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, etc.

The computer systems/servers are described in the general context of computer system executable instructions (for example, program modules) executed by the computer system. Generally, the program modules may include routines, programs, target programs, components, logics, and data structures, to execute specific tasks or implement specific abstract data types. The computer systems/servers are practiced in the distributed cloud computing environments in which tasks are executed by remote processing devices that are linked through a communications network. In the distributed computing environments, program modules are located in local or remote computing system storage media including storage devices.

FIG. 1 is a flowchart of one or more embodiments of a method for dynamically adding facial images into a database of the present disclosure. The method can be executed by an apparatus for dynamically adding facial images into a database, such as a terminal device or a server. Embodiments of the present disclosure do not define specific implementation of the apparatus for dynamically adding facial images into a database. As shown in FIG. 1, the method according to the embodiment includes the following operations.

At block 101, an obtained first facial image is compared with pre-stored facial image information in an image database.

In some embodiments, the image database is configured to store one or more facial images, where to facilitate distinguishing, the facial image stored in the image database is hereinafter referred to as a pre-stored facial image. In this case, according to one or more embodiments of the present disclosure, whether the image database has a pre-stored facial image matching the first facial image is determined by comparing the first facial image with the pre-stored facial image in the image database, e.g., determining similarity between the first facial image and the pre-stored facial image.

In other embodiments, the image database is configured to store feature information of the facial image, where to facilitate distinguishing, the feature information of the facial image stored in the image database is hereinafter referred to as a pre-stored facial image feature. In this case, according to one or more embodiments of the present disclosure, whether the image database has a pre-stored facial image feature matching the first facial image is determined by comparing the first facial image with the pre-stored facial image feature in the image database, e.g., determining similarity between the feature information of the first facial image and the pre-stored facial image feature.

In other embodiments, the image database also stores other attribute information of the facial image, which is not limited by the embodiments of the present disclosure.

In the embodiments of the present disclosure, the pre-stored facial image information includes a pre-stored facial image and/or pre-stored attribute information of a facial image, such as feature information, which is not limited by the embodiments of the present disclosure.

According to one or more embodiments of the present disclosure, the image database in the initial state is empty or has stored a facial image and/or attribute information of a facial image. By continuously running the method of the embodiments of the present disclosure, more and more qualified facial images and/or attribute information thereof is automatically stored in the image database to implement the construction of the image database.

In an optional example, the block 101 is performed by a processor by invoking a corresponding instruction stored in a memory, or is performed by a comparison unit 21 run by the processor.

At block 102, in response to a comparison result indicating that the first facial image has no matched pre-stored facial image information in the image database, it is determined whether to store at least one of the first facial image and feature information of the first facial image in the image database.

In an optional example, the block 102 is performed by a processor by invoking a corresponding instruction stored in a memory, or is performed by a storage unit 22 run by the processor.

Based on the method for dynamically adding facial images into a database provided by the embodiments of the present disclosure, the obtained facial image is compared with the pre-stored facial image in the image database, and if the facial image has no corresponding pre-stored facial image information in the image database, it is indicated that the facial image is likely to occur for the first time or is previously deleted from the image database. In this case, in response to the comparison result indicating that the facial image has no matched pre-stored facial image information in the image database, it is determined whether to store at least one of a facial image and/or feature information of the facial image in the image database, which is beneficial to realize the retrieval and storage of facial images in the case of no preset face standard library or incomplete face standard library data, thereby realizing dynamic database storage. In the process of continuous face comparison, the qualified facial image and/or feature information thereof is added to the image database, thereby constructing an image database based on the dynamic database storage mode.

Figure 2:
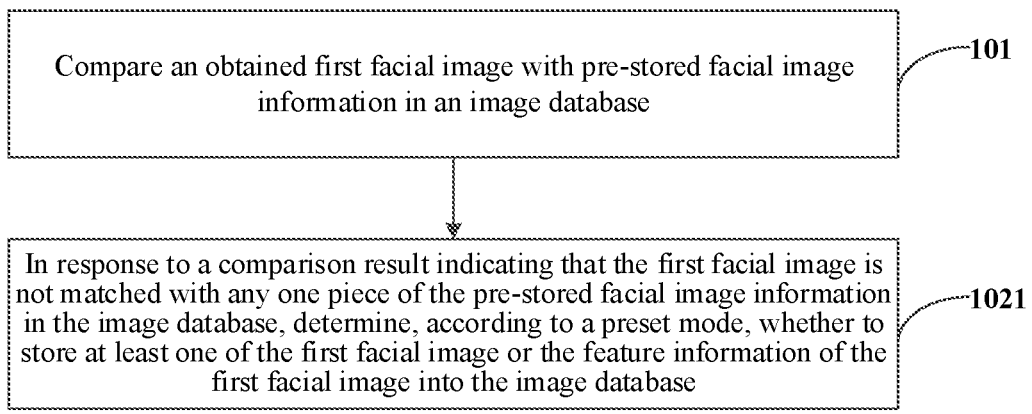
FIG. 2 illustrates flowchart of one or more embodiments of a method for dynamically adding facial images into a database according to the present disclosure.

In an optional example of the embodiments of the method for dynamically adding facial images into a database of the present disclosure, as shown in FIG. 2, the determining whether to store at least one of a first facial image and feature information of the first facial image in an image database includes: determining, according to a preset mode, whether to store at least one of the first facial image and the feature information of the first facial image in the image database, as shown in block 1021.

In one or more embodiments, for the case that there is no matching of the first facial image, the person corresponding to the first facial image is considered as a new person. In this case, the facial image is operated according to a preset mode set in advance. According to one or more embodiments of the present disclosure, the preset mode includes one or more of the following modes.

A first mode of storing at least one of the first facial image and the feature information of the first facial image, that has no matched pre-stored facial image information, in the image database. In actual applications, when it is required to dynamically establish or extend an image database, the first preset mode is generally adopted to store the facial images and/or feature information of facial images of all new persons in the image database. During storage, the facial image is stored in the image database, or the feature information of the facial image is stored in the image database, or the facial image and the feature information of the facial image are stored in the image database, thereby implementing update of the image database, so as to recognize whether a facial image newly obtained is a facial image of a new person based on the updated image database.

A second mode of not storing at least one of the first facial image and the feature information of the first facial image, that has no matched pre-stored facial image information, in the image database. In actual applications, there is also a case, in which it is necessary to judge the currently obtained first facial image and/or the feature information of the first facial image, but the first facial images and/or the feature information of the first facial images is temporary data and does not need to be stored. For example, it is necessary to count the persons entering a certain place and the facial images thereof, and it is necessary to compare the person who leaves with the one who entered, but there is no need for storage. In this case, it is set to the second preset mode, and the first facial image and the feature information of the first facial image, that has no matched pre-stored facial image information, is not stored in the image database.

A third preset mode of storing or not storing the first facial image and the feature information of the first facial image, that has no matched pre-stored facial image information, in the image database according to the obtained operation instruction information. In actual applications, there is also a case of prompting the user to operate the information of the first facial image that has no matched image currently by means of prompt information, and correspondingly operating the facial image that has no matched image according to the operation instruction information fed back by the user.

Figure 3:
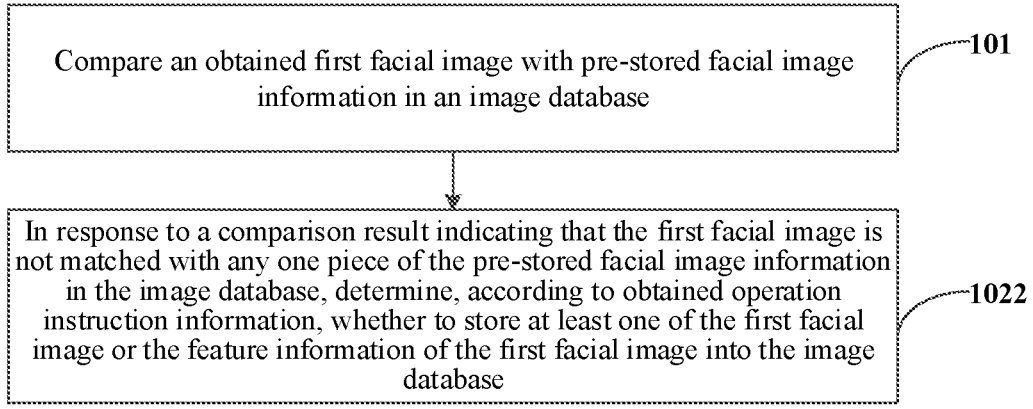
FIG. 3 illustrates flowchart of one or more embodiments of a method for dynamically adding facial images into a database according to the present disclosure.

According to one or more embodiments of the present disclosure, as shown in FIG. 3, it is determined, according to the obtained operation instruction information, whether to store at least one of the first facial image and the feature information of the first facial image in the image database, as shown in block 1022.

According to one or more embodiments of the present disclosure, the operation instruction information includes storage operation instruction information and non-storage operation instruction information; where the storage operation instruction information is configured to indicate to store at least one of the first facial image and the feature information of the first facial image in the image database, and the non-storage operation instruction information is configured to indicate not to store at least one of the first facial image and the feature information of the first facial image in the image database.

When the operation instruction information is the storage operation instruction information, it is determined to store at least one of the first facial image and the feature information of the first facial image in the image database according to the storage operation instruction information; or When the operation instruction information is the non-storage operation instruction information, it is determined not to store at least one of the first facial image and the feature information of the first facial image in the image database according to the non-storage operation instruction information. In one or more embodiments, it is pointed out that in the preset mode, it can also be preset to store or not store the first facial image and/or the feature information of the first facial image by means of the user operation information, and in this case, it only needs to set to operate according to the user operation information. In this mode, the user's participation is increased, and the user is provided with a more personalized service. According to one or more embodiments of the present disclosure, the mode is configured to be a manual mode, and whether to store in the database is decided according to confirmation information fed back by the user, and the confirmation information includes "storing in the database" and "not storing in the database."

Since whether to store the first facial image and/or the feature information of the first facial image in the image database includes two cases: storing and not storing, and these two cases do not occur at a same time. Therefore, the first preset mode and the second preset mode generally do not occur at a same time, and the third preset mode determines whether to store the facial image in the database according to the user's operation, which is more flexible, and also has the two cases of storing or not storing.

In some optional embodiments, the storing the facial image in the image database according to the preset mode includes the following operations.

The facial image is stored in the image database in response to the fact that the preset mode is the first preset mode. And/or, the facial image is stored in the image database according to the storage operation instruction information in response to the fact that the preset mode is the third preset mode.

In one or more optional embodiments, the not storing the facial image in the image database according to the preset mode includes the following operations.

The facial image is not stored in the image database in response to the fact that the preset mode is the second preset mode. And/or, the facial image is not stored in the image database according to the non-storage operation instruction information in response to the fact that the preset mode is the third preset mode.

In one or more embodiments, whether to add a new facial image into the database is controlled by a pre-set mode, for example, if the mode is configured to be an auto-save mode (corresponding to the first preset mode), the facial image that is retrieved to have no corresponding facial image in the image database is automatically stored in the database. While if the mode is configured to be an auto-no-save mode (corresponding to the second preset mode), regardless of whether there is a corresponding facial image in the image database, the facial image is not stored in the database. The manner of setting the mode in advance can uniformly regulate whether to store the facial image in the image database, and no man power is involved in the entire storage process.

Figure 4:
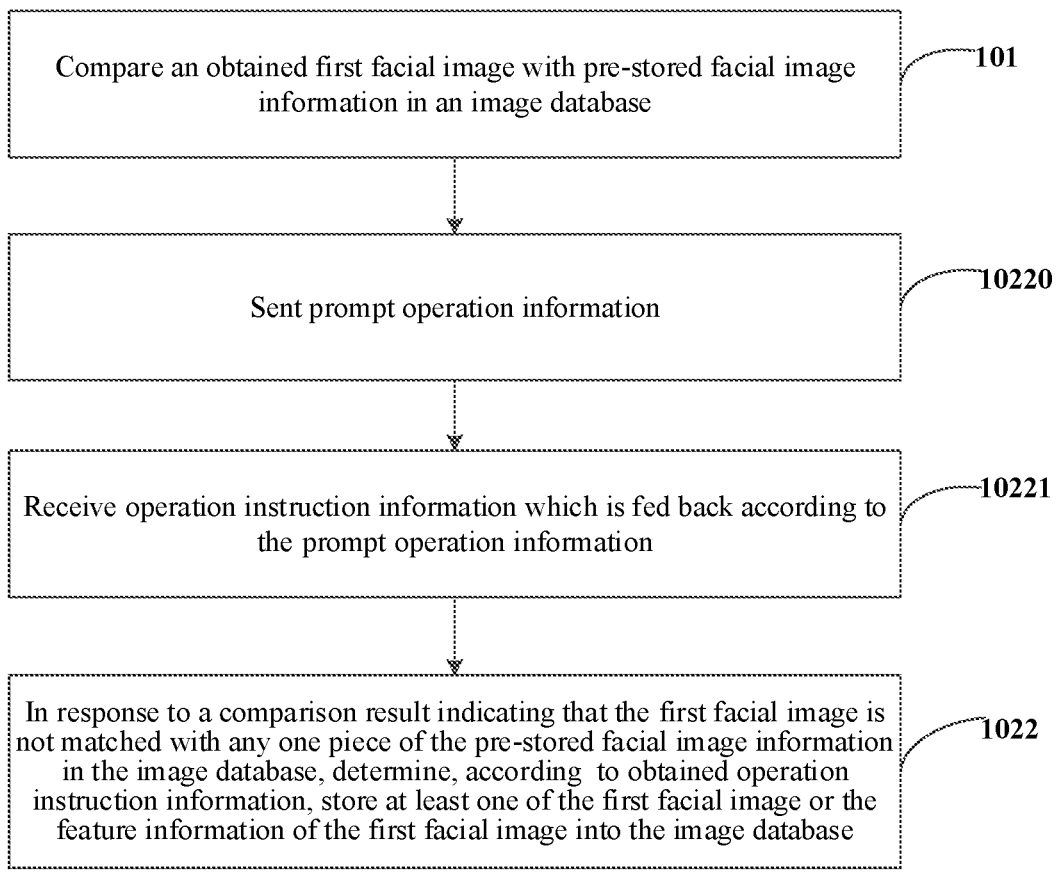
FIG. 4 illustrates flowchart of one or more embodiments of a method for dynamically adding facial images into a database according to the present disclosure.

In an optical example of the embodiments of the method for dynamically adding facial images into a database of the present disclosure, as shown in FIG. 4, before the determining, according to obtained operation instruction information, whether to store at least one of the first facial image and the feature information of the first facial image in the image database, the method further includes the following operations.

At block 10220, prompt operation information is sent.

At block 10221, the operation instruction information fed back according to the prompt operation information is received.

According to one or more embodiments of the present disclosure, in response to the fact that the operation instruction information fed back according to the prompt operation information is received within a preset time period, determining, according to obtained operation instruction information, whether to store at least one of the first facial image or the feature information of the first facial image into the image database.

In one or more embodiments, it is proposed that the acquired facial image is "stored in the database" or "not stored in the database" according to merely the operation instruction information, where "stored in a database" refers to storing in the image database, and "not stored in a database" refers to not storing in the image database. The image database in the present disclosure can be set at the cloud side (but not limited to the cloud side). The advantage of setting at the cloud side is that the memory is large and the cost is low. In this case, it is needed to send prompt operation information to the client, and the user feeds back an operation instruction after receiving the prompt operation information. The operation instruction generally includes "stored in a database" and "not stored in a database," and the facial image is stored or not stored in the image database according to the operation instruction.

According to one or more embodiments of the present disclosure, in response to the fact that the user instruction information fed back according to the prompt operation information is not received within a preset time period, the prompt operation information is repeatedly sent, or it is determined not to store at least one of the first facial image and the feature information of the first facial image in the image database.

One or more embodiments provide a special case. In general, the feedback cannot be waited indefinitely after the prompt operation information is sent, and a time period is preset. If the fed back user operation information is not received within the preset time period, whether to store the person in database cannot be decided and operated. In this case, it is selected to resend the prompt operation information until the feedback is received, and the first facial image and/or the feature information of the first facial image is operated according to the fed back user operation information; or it is selected to abandon the first facial image and/or the feature information of the first facial image, and to execute a retrieval operation of the next first facial image.

In another embodiment of the method for dynamically adding facial images into a database of the present disclosure, based on the embodiments, the image database includes at least one pre-stored facial image and the number of occurrences corresponding to the pre-stored facial image.

The method according to the embodiment further includes: in response to the comparison result indicating that the first facial image has matched pre-stored facial image information in the image database, adding the number of occurrences corresponding to the pre-stored facial image information matching the first facial image in the image database by 1.

According to one or more embodiments of the present disclosure, in this case, the first facial image is not stored in the image database.

One or more embodiments can implement statistics on the number of occurrences of the repeatedly appeared face. The user can be provided with the required data in the actual applications based on the statistics on the number of occurrences of the face. For example, a user is in a high-net-worth industry, and the user wants to collect the statistics about the high-frequency visitors among the visited customers every day. According to statistical experience, the high-frequency visiting customers have a higher buying desire, and the sales personnel focuses on sales promotion to such people. The image database is non-inductively established in a mode of dynamically storing in the database, and the user's demands are realized by combining technologies such as face comparison, counting of the number of occurrences of the repeatedly appeared face, etc.

According to one or more embodiments of the present disclosure, the image database includes at least one image group, and the image group stores at least one second facial image of a same person and acquisition time and an acquisition location corresponding to each of the at least one second facial image.

The method of one or more embodiments further includes: in response to the number of occurrences corresponding to the pre-stored facial image information being greater than 2, establishing a behavior trajectory of a person corresponding to the pre-stored facial image information based on at least one second facial image in an image group where, to which the pre-stored facial image information belongs, as well as an acquisition time and an acquisition location of each of the at least one second facial image.

In an optional example, at least one piece of pre-stored facial image information in the image database corresponds to at least one image group (for example, each pre-stored facial image information corresponds to one image group), and the image group stores the facial image information of the same person and the acquisition time and the acquisition location of each facial image information.

The method of one or more embodiments may further include: in response to the fact that the number of occurrences of the facial image is greater than 2, the behavior trajectory of the same person is established based on a plurality of facial images in the image group in which the facial image is located and the acquisition time and the acquisition location thereof.

In one or more embodiments, at least one image group is established for the facial images of at least one person (for example, an image group is established for each person's facial images), so as to avoid repeatedly comparing the facial images of a same person when a new facial image is received for query subsequently, thereby saving the retrieval time and improving the retrieval efficiency, and providing material for establishing the person's behavior trajectory. There are two cases for the obtained facial image, one is a new image that does not exist in the image database, and the other is a facial image corresponding to a person that already exists in the image database as referred to in one or more embodiments, and in this case, the behavior trajectory corresponding to the person can be established based on the facial image and a facial image corresponding to the person that has been stored in the image database. In order to establish a more complete person-based behavior trajectory, the newly collected facial image can also be stored in the image group corresponding to the person. When the behavior trajectory needs to be established next time, the facial image collected this time can be applied to.

In one or more optional embodiments, the image database includes at least one image group, and the image group is configured to store a plurality of second facial images of a same person.

To facilitate distinguishing, the facial image stored in the image group is called a second facial image.

According to one or more embodiments of the present disclosure, the image group stores the second facial image, or stores feature information of the second facial image, or both the second facial image and the feature information of the second facial image in the image group.

Figure 5:
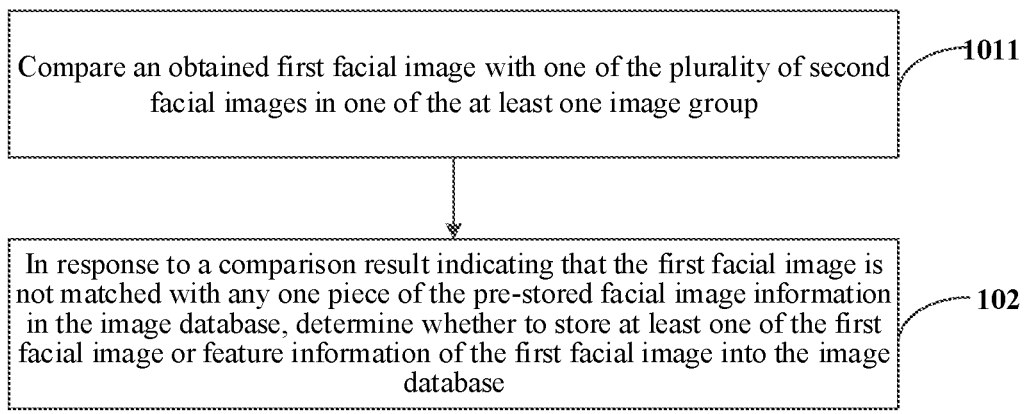
FIG. 5 illustrates flowchart of one or more embodiments of a method for dynamically adding facial images into a database according to the present disclosure.
Figure 6:
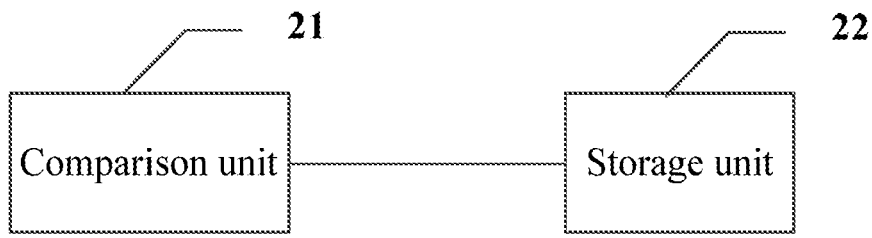
FIG. 6 illustrates a schematic structural diagram of one or more embodiments of an apparatus for dynamically adding facial images into a database according to the present disclosure.
Figure 7:
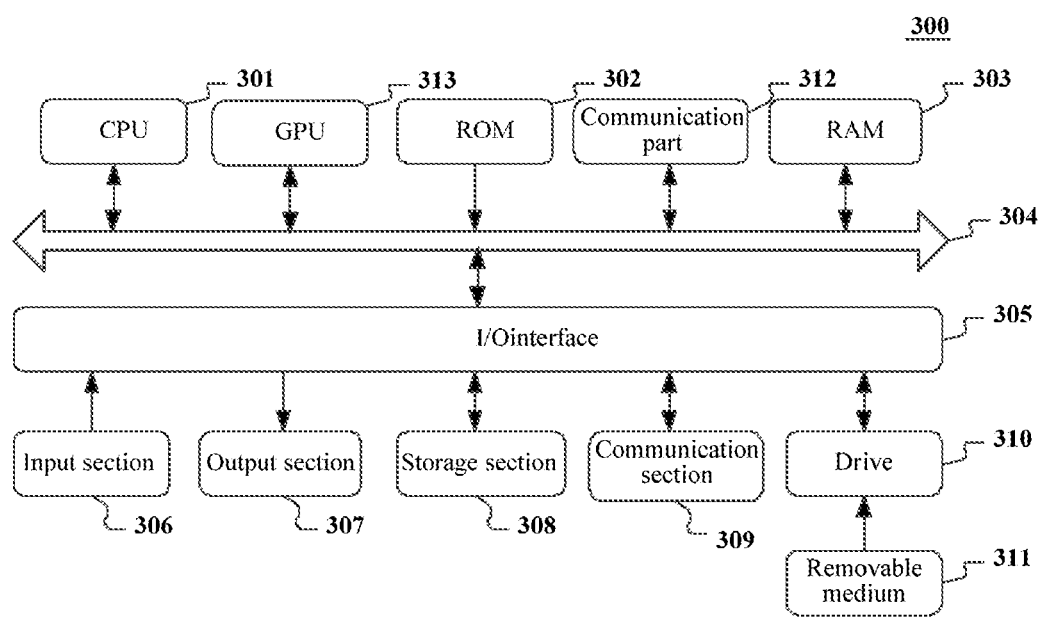
FIG. 7 illustrates a schematic structural diagram of an electronic device for implementing a terminal device or a server in embodiments according to the present disclosure.

As shown in FIG. 5, comparing the obtained first facial image with pre-stored facial image information in the image database includes: comparing the obtained first facial image with one of a plurality of second facial images in an image group in which the plurality of second facial images is stored, as shown in block 1011.

In one or more embodiments, image groups are established in the image database for different persons, respectively. On the basis of the image groups, the comparison of the facial images can be simplified as: comparing the obtained first facial image with any of the second facial images and/or the feature information of the second facial images in the image group, to recognize whether the obtained first facial image is a facial image corresponding to the person, and in this case, there is no limitation on the storage time and location for the facial image and/or the feature information of the facial image in the image group, and it is only necessary to determine whether the facial image corresponds to the same person to determine which image group the facial image belongs to. In actual applications, the facial image comparison method in one or more embodiments can be applied when it is necessary to recognize strangers in a wide range.

In a further embodiment of the method for dynamically adding facial images into a database of the present disclosure, on the basis of the embodiments above, before the operation 101, the method further includes the following operations.

At least one frame of video image including a facial image is obtained from a video stream.

Image segmentation on the video image is performed to obtain at least one facial image.

The at least one facial image includes the first facial image.

In one or more embodiments, the method for obtaining a facial image generally includes: collecting a video stream by means of an image collection device such as a camera, and decomposing the video stream to obtain video images. The video images are recognized by means of the face recognition technology (e.g., a Convolutional Neural Network (CNN)) to obtain a video image with a facial image, and the facial image is segmented from the video image by means of the image segmentation technology, thereby obtaining the collected facial image. One frame of video image may include at least one facial image, or may have no facial image. In the embodiments of the present disclosure, the video image without a facial image is not collected. The video image obtained by the decomposition is subjected to face matting, in which Software Development Kit (SDK)-detection is performed, the first face is selected if a plurality of faces are detected in a same matting and the one without a face is filtered.

In a further embodiment of the method for dynamically adding facial images into a database of the present disclosure, on the basis of the embodiments above, before comparing the obtained facial image with pre-stored facial image information in the image database, the method further includes the following operations.

A duplicate removing and filtering operation is performed on the collected facial images; or A duplicate removing and filtering operation is performed on the obtained facial images, and sending the facial images subjected to the duplicate removing and filtering operation to a cloud server, to compare the obtained facial images with the facial images existed in the image database.

According to one or more embodiments of the present disclosure, before comparing the obtained facial image with pre-stored facial image information in the image database, the method further includes the following operations.

A duplicate removing and filtering operation is performed on the plurality of obtained facial images to obtain at least one facial image, the at least one facial image including the first facial image. Or At least one facial image sent by a terminal device is received, where the at least one facial image is obtained by performing the duplicate removing and filtering operation on the plurality of obtained facial images by the terminal device, and the at least one facial image includes the first facial image.

In one or more embodiments, the collected facial image is preprocessed, and the purpose of the preprocessing is to make the obtained facial image better, so as to facilitate retrieval and recognition, and by means of duplicate removing and filtering, a facial image with better effect can be obtained from a large number of repeated facial images, which reduces the processing amount of the image, reduces the pressure of receiving the facial image, improves the efficiency of retrieval and storage, and improves the accuracy and the recall rate of the subsequent comparison search result based on the facial image.

According to one or more embodiments of the present disclosure, when the image database is provided at the cloud server, and the duplicate removing and filtering is applied to the client or the server, the following operations are performed at the client or the server. At least one frame of video image including the facial image is obtained from the collected video stream. Image segmentation is performed on all the video images to obtain at least one facial image.

The duplicate removing and filtering operation is performed on the collected facial image to obtain a facial image to be sent to the cloud.

The following operations are performed at the cloud server: comparing the facial image received from the server with the stored facial image in the image database, and determining whether the collected facial image has corresponding facial image in the image database.

The image database is configured to store collected facial image that is stored by means of the above determination. According to one or more embodiments of the present disclosure, the image database in the initial state is empty or has stored facial images. By continuously running the method of the embodiments of the present disclosure, more and more qualified facial images are automatically stored in the image database to implement the construction of the image database.

In one or more embodiments, the collected facial image is dynamically stored in the database by means of the interaction between the server and the cloud. In the process of continuously performing the face search, the qualified facial images are added to the image database, thereby constructing a dynamic storage-based image database. Moreover, due to the duplicate removing and filtering operation performed on the facial image at the server, the display effect of the obtained facial image is similar to the standard photo effect in the face annotation library in the prior art, thereby improving the efficiency in the subsequent recognition and search process.

In an optional example, in a certain time range, a selected facial feature of at least one person is compared with a local feature queue. According to a certain threshold, in the case of the comparison result being higher than the threshold, it is indicated that the face has been uploaded to the cloud server, and it is unnecessary to upload again; and in the case of the comparison result being lower than the threshold, it is indicated that the face is not uploaded to the cloud server previously, and the face is uploaded to the cloud server this time, and the feature thereof is stored in the feature queue.

Feature extraction is performed on the facial image, and the extracted feature is compared with the features in the queue within a set time range (configurable, e.g., 300 s), and a set value (configurable, e.g., 0.86) is used as a threshold. Similar images are filtered, dissimilar images are sent to the server, and the features thereof are saved in the queue.

In one or more optional embodiments, the performing a duplicate removing and filtering operation on the plurality of obtained facial images to obtain at least one facial image includes the following operations.

A third facial image in the plurality of facial images is matched with at least one facial image in an image queue to obtain a matching result.

In response to the matching result indicating that the third facial image has a matched image in the image queue, determining that the third facial image is a duplicate image, and/or not storing the third facial image in the image queue.

According to one or more embodiments of the present disclosure, when the third facial image is matched with the facial image in the image queue, the features of the third facial image are matched with the features of the facial image in the image queue, and whether the third facial image is a duplicate image is determined according to a feature matching result.

According to one or more embodiments of the present disclosure, the method may further include: in response to the matching result indicating that the third facial image has no matched image in the image queue, determining that the third facial image is not a duplicate image, and/or adding the third facial image into the image queue.

In an optional example, the performing a duplicate removing and filtering operation on the plurality of obtained facial images to obtain at least one facial image includes the following operations.

A filtering operation is performed on the obtained facial images to obtain at least one facial image with the image quality reaching a first preset condition.

At least one facial image is matched with at least one facial image pre-stored in the image queue to obtain a matching result.

In response to the matching result indicating that the facial image has a matched image in the image queue, determining that the facial image is a duplicate image, and/or not storing the facial image in the image queue. And/or, in response to the matching result indicating that the facial image has no matched image in the image queue, determining that the facial image is not a duplicate image, and/or storing the facial image in the image queue.

In one or more optional embodiments, the image queue includes at least one facial image separately corresponding to different persons and/or facial features corresponding to the facial image. Each facial image in the image queue may separately correspond to different persons, or a part of the image included in the image queue separately corresponds to different persons. Specifically, recognizing whether two facial images match can be obtained based on the distance between the facial features corresponding to the facial image, and the distance between the facial features includes a cosine distance, an Euclidean distance, etc., and one or more embodiments does not limit the distance calculation method of the specific features.

According to one or more embodiments of the present disclosure, if the filtered facial image and the pre-stored facial image correspond to the same person, the facial image is a duplicate image, which indicates that the facial image corresponding to the person has subjected to the duplicate removing and filtering. In this case, it can be selected to abandon the facial image or use the facial image to replace the corresponding facial image of the person in the image queue. Moreover, if the filtered facial image and the pre-stored facial image do not correspond to the same person, the facial image is not a duplicate image, which indicates that the person corresponding to the facial image is new and needs to be queued for subsequent recognition.

By performing the filtering operation on the plurality of obtained facial images, at least one facial image with the image quality reaching the first preset condition is obtained, so that the quality-based filtering is implemented, the number of facial images is reduced, and the quality of the obtained facial image satisfies the subsequent processing requirements for the facial image, and the problem of repeatedly processing a large number of facial images is avoided. At least one facial image is matched with at least one facial image pre-stored in the image queue to obtain a matching result, and whether to perform a duplicate removing operation on the facial image is determined according to the matching result, and whether the facial image has been stored is determined according to the known image queue, thereby achieving faster duplicate face recognition.

According to one or more embodiments of the present disclosure, the matching a third facial image in the plurality of facial images with at least one facial image in an image queue to obtain a matching result includes the following operations.

A similarity between the third facial image and each facial image in the image queue is obtained based on facial features corresponding to the third facial image and facial features corresponding to the each of at least one facial image in the image queue.

A matching result is obtained based on the similarity between the third facial image and each facial image in the image queue.

According to one or more embodiments of the present disclosure, the similarity between the third facial image and each facial image in the image queue is determined by means of the distance between the facial feature corresponding to the third facial image and the facial feature corresponding to the facial image in the image queue (e.g., the Euclidean distance, the cosine distance, etc.). Therefore, the facial image and/or the facial feature corresponding to the facial image can be stored in the image queue. If the facial feature is stored in the image queue, when the similarity is determined, the facial features corresponding to the third facial image can be matched with the facial features in the image queue to speed up the recognition.

According to one or more embodiments of the present disclosure, the obtaining a matching result based on the similarity between the third facial image and each facial image in the image queue includes the following operations.

In response to presence of a facial image in the image queue with a similarity to the third facial image greater than or equal to a preset similarity, a matching result indicating that the third facial image has a matched image in the image queue is obtained. And/or, in response to absence of a facial image in the image queue with a similarity to the third facial image greater than or equal to the preset similarity, obtaining a matching result indicating that the third facial image has no matched image in the image queue.

In one or more optional embodiments, before the performing a duplicate removing and filtering operation on the plurality of obtained facial images to obtain at least one facial image, the method of one or more embodiments further includes: performing a quality-based filtering operation on a plurality of obtained fourth facial images to obtain the plurality of facial images with image quality reaching a first preset condition.

According to one or more embodiments of the present disclosure, the performing a quality-based filtering operation on a plurality of obtained fourth facial images may include the following operations.

The plurality of obtained fourth facial images is filtered based on a facial attribute corresponding to the fourth facial image, the facial attribute indicating the display quality of a face in the facial image, and the facial attribute in one or more embodiments indicating the display quality of a face in the facial image. And/or, the plurality of obtained fourth facial images is filtered based on a facial angle in the facial image, the facial angle indicating a deflection angle of the face in the facial image, and the facial angle in one or more embodiments indicating a deflection angle of the face in the fourth facial image.

According to one or more embodiments of the present disclosure, the facial attribute include, but is not limited to, one or more of the following: a facial angle, a facial width-height value, and the facial blurring degree. According to one or more embodiments of the present disclosure, the facial angle may include, but is not limited to, a yaw indicating the steering angle of the face in the horizontal direction; a pitch indicating the rotation angle of the face in the vertical direction; and a roll indicating the deflection angle of the face in the vertical direction.

In one or more optional embodiments, the filtering the plurality of obtained fourth facial images based on a facial attribute corresponding to the fourth facial image includes the following operations.

In response to a first condition being satisfied, determining that the image quality of the fourth facial image reaches the first preset condition, where the first condition includes at least one of the following: the facial angle is within a first preset range, the facial width-height value is greater than a second preset threshold, or the facial blurring degree is less than a third preset threshold. Or, a facial attribute corresponding to a face in the facial image is obtained to determine the facial attribute.

The matching at least one facial image with a pre-stored facial image in an image queue includes the following operations.

In response to the fact that at least one of the following conditions is satisfied: the facial angle is within a first preset range, the facial width-height value is greater than a second preset threshold, or the facial blurring degree is less than a third preset threshold, at least one facial image is matched with a pre-stored facial image in an image queue.

In one or more optional embodiments, the performing a quality-based filtering operation on a plurality of obtained fourth facial images to obtain the plurality of facial images with image quality reaching a first preset condition includes the following operations.

At least one fourth facial image corresponding to a same person is recognized from the plurality of fourth facial images.

The at least one fourth facial image corresponding to the same person is filtered to obtain facial images in the at least one fourth facial image with the quality reaching the first preset condition.

According to one or more embodiments of the present disclosure, the at least one fourth facial image corresponding to the same person is filtered to obtain one facial image in the at least one fourth facial image with the quality reaching the first preset condition.

The performing a duplicate removing and filtering operation on the plurality of obtained facial images to obtain at least one facial image includes: performing a duplicate removing and filtering operation on the plurality of obtained facial images corresponding to different persons to obtain at least one facial image.

The method further includes the following operations.

In response to the fact that at least one of the following conditions is satisfied: the facial angle is not within the first preset range, the facial width-height value is less than or equal to the second preset threshold, or the facial blurring degree is greater than or equal to the third preset threshold, the facial image is deleted.

According to one or more embodiments of the present disclosure, the first preset range can be set to ±20° (the specific value can be set according to specific conditions), when the yaw, the pitch, and the roll in the facial angle are between ±20° (the three angles can be set to be the same range or range of differences). The facial width-height can include the facial width and the facial height (generally returned by detection, which can be filtered by setting; for example, the facial width-height is set to 50 pixels, and a facial image with the width and height less than 50 pixels can be considered as unqualified, and the width and height can be set to different values or the same value). The facial blurring degree (generally returned by a queue toolkit (SDK-alignment), different values can be set, for example, the facial blurring degree is set to 0.7, a facial image with the blurring degree greater than 0.7 is considered to be a poor-quality facial image), where the values, i.e., ±20°, 50 pixels, and 0.7, are set thresholds, which can be set according to actual conditions.

And/or, the plurality of obtained facial images are respectively filtered based on a facial angle in the facial image, and the facial angle indicates the deflection angle of the face in the facial image. The deflection angle is relative to the standard front face, which refers to a face with the angle being 0 in the horizontal, vertical, and oblique directions, and the face can be used as the origin to calculate the deflection angle of the face.

In one or more optional embodiments, the performing a filtering operation on the plurality of obtained facial images to obtain at least one facial images with the image quality reaching a first preset condition includes the following operations.

At least one facial image corresponding to a same person is recognized from the plurality of facial images; and A facial trajectory is obtained based on at least one facial image corresponding to the same person.

The facial image in the facial trajectory is filtered based on the facial angle corresponding to the facial image to obtain facial images in the facial trajectory with the quality reaching the first preset condition.

In one or more embodiments, by filtering the facial image in the facial trajectory, obtaining an image of better quality for a person is achieved (for example, obtaining an image of better quality for each person is achieved), and whether the quality of the facial image reaches the first preset condition is determined by means of the facial angle. The first preset condition herein is adjusted according to the user setting, and is an angle range value or is set to take a facial image of better quality.

In one or more optional embodiments, the facial angle includes, but is not limited to, one or more of the following: a facial yaw angle, a facial pitch angle, and a facial roll angle.

According to one or more embodiments of the present disclosure, the filtering the at least one fourth facial image corresponding to the same person to obtain facial images in the at least one fourth facial image with the quality reaching the first preset condition includes the following operations.

The facial yaw angle, the facial pitch angle, and the facial roll angle corresponding to each fourth facial image are converted into a three-dimensional vector.

The at least one fourth facial image is filtered based on the distance between the three-dimensional vector and a source point to obtain the facial image in the at least one fourth facial image with the quality reaching the first preset condition, where the source point is a three-dimensional vector with all values equal to 0.

According to one or more embodiments of the present disclosure, the facial images in the facial trajectory are filtered based on the distance between the three-dimensional vector and the source point, and the source point is the three-dimensional vector with all values equal to 0.

In one or more embodiments, the distance value can be obtained by calculating a squared difference of the three-dimensional vector converted from the facial yaw angle, the facial pitch angle, and the facial roll angle, and the quality of the facial image is evaluated by the distance value, and the smaller the distance is, the better the quality of the facial image is, that is, the face in the facial image is closer to the front face, but one or more embodiments are not limited to obtain the distance value by calculating the square difference, and may also obtain the distance value by other methods. Moreover, for rapid filtering, the facial image in the facial trajectory is filtered within a set time interval (e.g., within 5 seconds, within 10 seconds, etc.).

In one or more optional embodiments, matching at least one facial image with at least one pre-stored facial image in the image queue to obtain a matching result includes the following operations.

A similarity between at least one facial image and a facial image in the image queue are obtained based on facial features corresponding to the at least one facial image and facial features corresponding to the facial image in the image queue.

In response to the fact that the similarity is greater than or equal to a preset similarity, a matching result indicating that the facial image has a matched image in the image queue is obtained.

In response to the fact that the similarity is less than the preset similarity, a matching result indicating that the facial image has no matched image in the image queue is obtained.

In one or more embodiments, duplicate removing of faces is implemented, and similarity comparison is performed on the obtained facial image of better quality and the stored facial image in the image queue according to the facial features. The facial features of the obtained facial image can be obtained by means of a neural network, and the image queue can store the facial image or store the facial image and corresponding facial features thereof. If the facial image is stored, when the similarity comparison is required, the facial features corresponding to the pre-stored facial image are first obtained by means of the neural network.

The duplicate removing and filtering provided by the embodiment above solves the problem that it is necessary to select an image frame suitable for processing from a plurality of consecutive image frames including the same face when a face in a real-time captured video is subjected to attribute detection and facial comparison, thereby achieving better attribute detection and facial comparison.

The duplicate removing and filtering provided by the embodiment above can also be applied to a client for processing the video stream. The qualified facial images are sent to the cloud. Directly sending all the images to the cloud would cause stress to the cloud, and repeated and low-quality facial images make little sense. Therefore, duplicate removing and filtering is required before the client uploads images to the cloud, and in this case, it is necessary to select a better facial image by means of one or more embodiments.

The duplicate removing and filtering provided by the embodiment above can be applied to the server. The advantage of being applied to the server is that the speed is fast, and it would not cause much stress to the cloud. The selected images are sent to the cloud and stored in the image database.

The scenarios to which the method for dynamically adding facial images into a database provided by embodiments of the present disclosure can be applied include, but are not limited to:

Scenario I: client I is a high-net-worth industry, and the client wants to collect the statistics about the ones with high visiting frequency among the daily customers who come to visit. According to statistical experience, the customers with a high visiting frequency have a higher purchase intention, and the sales personnel focuses on selling to such people. The face database is non-inductively established in a mode of dynamically adding into the database, and the client's demands are realized by combining the face comparison and other technologies.

Scenario II: client II is a new retail industry, and the client wants to identify each customer's location, walking trajectory, and associate a variety of operations such as purchase and area of interest in an unmanned supermarket. The face standard library is established in a manner of dynamically adding into the database. The face database then combines information such as time and camera location to correlate customer behaviors in different locations.

Scenario III: client III is a catering industry, and the client wants to combine meals that are frequently ordered by the customer in the past, and offers the customer's favorite food when the customer visits next time, thus improving the customer's consumption experience. The face standard library is established in a mode of dynamically storing in the database, and the identity of the customer can be quickly and accurately identified when he/she visits next time.

Any method provided by the embodiments of the present disclosure is performed by any suitable device having data processing capacity, including, but are not limited to, a terminal device, a server and so on. Alternatively, any method provided by the embodiments of the present disclosure is performed by the processor, for example, the processor performs any method provided by the embodiments of the present disclosure by invoking a corresponding instruction stored in the memory. The details are not described below.

A person of ordinary skill in the art may understand that all or some operations for implementing the embodiments of the foregoing method are achieved by a program by instructing related hardware; the foregoing program can be stored in a computer readable storage medium; when the program is executed, operations including the embodiments of the foregoing method is executed. Moreover, the foregoing storage medium includes various media capable of storing program codes such as ROM, RAM, a magnetic disk, or an optical disk.

In the embodiments of the present disclosure, the image database may include a facial image and/or feature information of the facial image, or may have no facial image and/or feature information of the facial image, and realizes the retrieval and storage of facial image information in the case of no preset face standard library or incomplete face standard library data, and in the process of continuous face comparison, the qualified facial image and/or feature information thereof is added to the image database, and the image database (or called the base library) is established in a mode of dynamically storing in the database.

FIG. 2 is a schematic structural diagram of one or more embodiments of an apparatus for dynamically adding facial images into a database of the present disclosure. The apparatus of the embodiment can be configured to realize the method embodiments of the present disclosure. As shown in FIG. 2, the apparatus of the embodiment includes a comparison unit 21 and a storage unit 22.

The comparison unit 21 is configured to compare an obtained first facial image with pre-stored facial image information in an image database.

The storage unit 22 is configured to determine, in response to a comparison result indicating that the first facial image has no matched pre-stored facial image information in the image database, whether to store the first facial image in the image database.

Based on the apparatus for dynamically adding facial images into a database provided by the embodiment of the present disclosure, the retrieval and storage of the facial image in the case of no preset face standard library or incomplete face standard library data is achieved, thereby dynamically adding the facial images into the database, and in the process of continuous face comparison, the qualified facial image is added to the image database, so as to establish an image database in a mode of dynamically storing in the database.

In an optional example of the embodiment of the apparatus for dynamically adding facial images into a database of the present disclosure, the storage unit 22 is configured to determine, according to a preset mode, whether to store at least one of the first facial image and the feature information of the first facial image in the image database. That is, it can be selected to store or not store in the image database.

According to one or more embodiments of the present disclosure, the preset mode includes: a first mode of storing at least one of the first facial image and the feature information of the first facial image, that has no matched pre-stored facial image information, in the image database.

According to one or more embodiments of the present disclosure, the preset mode includes: a second mode of not storing at least one of the first facial image and the feature information of the first facial image, that has no matched pre-stored facial image information, in the image database.

According to one or more embodiments of the present disclosure, the preset mode includes a third preset mode of storing or not storing the facial image that has no matched facial image information in the image database according to obtained operation instruction information.

In one or more optional embodiments, the operation instruction information in the third preset mode includes storage operation instruction information and non-storage operation instruction information, the storage operation instruction information is configured to indicate to store the facial image in the image database, and the non-storage operation instruction information is configured to indicate not to store the facial image in the image database.

In one or more optional embodiments, the storage unit 22 is configured to store the facial image in the image database in response to the fact that the preset mode is the first preset mode when the facial image is stored in the image database according to the preset mode.

According to one or more embodiments of the present disclosure, the storage unit 22 is configured to store the facial image in the image database according to the storage operation instruction information in response to the fact that the preset mode is the third preset mode when the facial image is stored in the image database according to the preset mode.

In one or more optional embodiments, the storage unit 22 is configured to not store the facial image in the image database in response to the fact that the preset mode is the second preset mode when the facial image is not stored in the image database according to the preset mode.

According to one or more embodiments of the present disclosure, the storage unit 22 is configured to not store the facial image in the image database according to the non-storage operation instruction information in response to the fact that the preset mode is the third preset mode when the facial image is not stored in the image database according to the preset mode.

In one or more optional embodiments, the storage unit is configured to determine whether to store at least one of the first facial image and the feature information of the first facial image in the image database according to the obtained operation instruction information.

According to one or more embodiments of the present disclosure, the operation instruction information includes storage operation instruction information and non-storage operation instruction information. The storage operation instruction information is configured to indicate to store at least one of the first facial image and the feature information of the first facial image in the image database, and the non-storage operation instruction information is configured to indicate not to store at least one of the first facial image and the feature information of the first facial image in the image database.

According to one or more embodiments of the present disclosure, the storage unit is configured to determine to store at least one of the first facial image and the feature information of the first facial image in the image database according to the storage operation instruction information; or determine not to store at least one of the first facial image and the feature information of the first facial image in the image database according to the non-storage operation instruction information.

In one or more optional embodiments, before the storage unit 22 determines, according to the operation instruction information, whether to store at least one of the first facial image and the feature information of the first facial image in the image database, the apparatus further includes a prompt module and a feedback operation module.

The prompt module is configured to send prompt operation information; and

The feedback operation module is configured to receive the operation instruction information fed back according to the prompt operation information.

According to one or more embodiments of the present disclosure, the storage unit 22 further includes a timeout module.

The timeout module is configured to repeatedly send, in response to not receiving, within a preset time period, the operation instruction information fed back according to the prompt operation information, the prompt operation information, or determine not to store at least one of the first facial image and the feature information of the first facial image in the image database.

In another embodiment of the apparatus for dynamically adding facial images into a database of the present disclosure, based on the embodiments above, the image database includes at least one piece of pre-stored facial image information and the number of occurrences of each pre-stored facial image information.

The apparatus of the embodiment further includes an accumulation unit.

The accumulation unit is configured to add, in response to the comparison result indicating that the first facial image has matched pre-stored facial image information in the image database, the number of occurrences of the pre-stored facial image information matching the first facial image in the image database by 1.

One or more embodiments can implement statistics on the number of occurrences of the repeatedly appeared face. The user can be provided with the required data in the actual application based on the statistics on the number of occurrences of the face. For example, a user is in a high-net-worth industry, and the user wants to collect the statistics about the high-frequency visitors among the customers who come to visit every day. According to statistical experience, the high-frequency visiting customers have a higher buying desire, and the sales personnel focuses on selling to such people. The image database is non-inductively established in a mode of dynamically storing in the database, and the user's demands are realized by combining the face comparison and the counting of the number of occurrences of the repeatedly appeared face, etc.

In an optional example of the embodiments of the apparatus for dynamically adding facial images into a database of the present disclosure, the image database includes at least one image group, and the image group stores a plurality of second facial images of a same persona same person and acquisition time and an acquisition location of each second facial image.

The apparatus of the embodiment further includes a trajectory establishment unit.

The trajectory establishment unit is configured to establish, in response to the fact that the number of occurrences of the pre-stored facial image information is greater than 2, a behavior trajectory of a person corresponding to the pre-stored facial image information based on at least one second facial image in an image group where, to which the pre-stored facial image information belongs, as well as an acquisition time and an acquisition location of each of the at least one second facial image.

In one or more optional embodiments, the image database includes at least one image group, and the image group is configured to store a plurality of second facial images of a same person.

The comparison unit is configured to compare the obtained first facial image with one of a plurality of second facial images in an image group in which the plurality of second facial images is stored.

In yet another embodiment of the apparatus for dynamically adding facial images into a database of the present disclosure, based on the embodiments above, the apparatus further includes a video collection unit and an image segmentation unit.

The video collection unit is configured to obtain at least one frame of video image including a facial image from a video stream; and The image segmentation unit is configured to perform image segmentation on the video image to obtain at least one facial image.

The at least one facial image includes the first facial image.

In one or more embodiments, the method for obtaining facial images generally includes: collecting a video stream by means of an image collection device such as a camera, and decomposing the video stream to obtain a video image. For the video image, a video image with a facial image is recognized by means of the face recognition technology (e.g., a CNN), and the facial image is segmented from the video image by means of the image segmentation technology, to obtain the collected facial image. A video image frame may include at least one facial image, or may have no facial image. The present disclosure does not collect the video image without a facial image. The decomposed video image is subjected to image matting and SDK-detect, to take the first image in a plurality of facial image detected in the same matting, and filter the images without a face.

In yet another embodiment of the apparatus for dynamically adding facial images into a database of the present disclosure, based on the embodiments above, the apparatus further includes a duplicate removing and filtering unit.

The duplicate removing and filtering unit is configured to perform a duplicate removing and filtering operation on the plurality of obtained facial images to obtain at least one facial image, the at least one facial image including the first facial image, or receive at least one facial image sent by a terminal device, where the at least one facial image is obtained by performing the duplicate removing and filtering operation on the plurality of obtained facial images by the terminal device, and the at least one facial image includes the first facial image.

In one or more embodiments, the collected facial image is preprocessed, and the purpose of the preprocessing is to make the obtained facial image better, so as to facilitate retrieval and recognition, and by means of duplicate removing and filtering, a facial image with better effect can be obtained from a large number of repeated facial images, which reduces the processing amount of the image, reduces the pressure of receiving the facial image, improves the efficiency of retrieval and storage, and greatly improves the accuracy and the recall rate of the subsequent comparison search result based on the facial image.

In one or more optional embodiments, the duplicate removing and filtering unit includes a matching module and a duplicate removing module.

The matching module is configured to match a third facial image in the plurality of facial images with at least one facial image in an image queue to obtain a matching result; and The duplicate removing module is configured to determine, in response to the matching result indicating that the third facial image has a matched image in the image queue, that the third facial image is a duplicate image, and/or not store the third facial image in the image queue.

According to one or more embodiments of the present disclosure, the duplicate removing module is further configured to determine, in response to the matching result indicating that the third facial image has no matched image in the image queue, that the third facial image is not a duplicate image, and/or add the third facial image into the image queue.

In one or more optional embodiments, the duplicate removing and filtering unit includes a filtering module, a matching module and a duplicate removing module.

The filtering module is configured to perform a filtering operation on the obtained facial images to obtain at least one facial image with the image quality reaching a first preset condition;

The matching module is configured to match at least one facial image with at least one facial image pre-stored in the image queue to obtain a matching result; and The duplicate removing module is configured to determine, in response to the matching result indicating that the facial image has a matched image in the image queue, that the facial image is a duplicate image, and/or not store the facial image in the image queue; and/or determine, in response to the matching result indicating that the facial image has no matched image in the image queue, that the facial image is not a duplicate image, and/or store the facial image in the image queue.

According to one or more embodiments of the present disclosure, the matching module is configured to obtain a similarity between the third facial image and each facial image in the image queue based on facial features corresponding to the third facial image and facial features corresponding to the each of at least one facial image in the image queue; and obtain a matching result based on the similarity between the third facial image and each facial image in the image queue.

According to one or more embodiments of the present disclosure, if a matching result is obtained based on the similarity between the third facial image and each facial image in the image queue, the matching module is configured to obtain, in response to presence of a facial image in the image queue with a similarity to the third facial image greater than or equal to a preset similarity, a matching result indicating that the third facial image has a matched image in the image queue; and/or obtain, in response to absence of a facial image in the image queue with a similarity to the third facial image greater than or equal to a preset similarity, a matching result indicating that the third facial image has no matched image in the image queue.

According to one or more embodiments of the present disclosure, the apparatus further includes a filtering module.

The filtering module is configured to perform a quality-based filtering operation on a plurality of obtained fourth facial images to obtain the plurality of facial images with image quality reaching a first preset condition.

According to one or more embodiments of the present disclosure, the filtering module includes an attribute filtering module and/or an angle filtering module.

The attribute filtering module is configured to filter the plurality of obtained fourth facial images based on a facial attribute corresponding to the fourth facial image, the facial attribute indicating the display quality of a face in the facial image, and the facial attribute in one or more embodiments indicating the display quality of a face in the fourth facial image;

The angle filtering module is configured to filter the plurality of obtained fourth facial images based on a facial angle in the fourth facial image, the facial angle indicating a deflection angle of the face in the facial image, and the facial angle in one or more embodiments indicating a deflection angle of the face in the fourth facial image.

According to one or more embodiments of the present disclosure, the facial attribute includes, but is not limited to, one or more of the following: the facial angle, the facial width-height value, and the facial blurring degree.

The attribute filtering module is configured to determine, in response to a first condition being satisfied, that the image quality of the fourth facial image reaches the first preset condition, where the first condition includes at least one of the following: the facial angle is within a first preset range, the facial width-height value is greater than a second preset threshold, or the facial blurring degree is less than a third preset threshold, and match at least one facial image with the pre-stored facial image in the image queue.

In an optional example of the embodiments of the apparatus for dynamically adding facial images into a database of the present disclosure, the attribute filtering module is further configured to, in response to the fact that at least one of the following conditions is satisfied: the facial angle is not within the first preset range, the facial width-height value is less than or equal to the second preset threshold, or the facial blurring degree is greater than or equal to the third preset threshold, delete the facial image.

In an optional example of the embodiments of the apparatus for dynamically adding facial images into a database of the present disclosure, the filtering module is configured to recognize at least one fourth facial image corresponding to a same person from the plurality of fourth facial images; and filter the at least one fourth facial image corresponding to the same person to obtain facial images in the at least one fourth facial image with the quality reaching the first preset condition.

A facial trajectory is obtained based on at least one facial image corresponding to the same person.

The facial images in the facial trajectory are filtered based on the facial angles corresponding to the facial images to obtain the facial images in the facial trajectory with the quality reaching the first preset condition.

According to one or more embodiments of the present disclosure, the filtering module is specifically configured to filter the at least one fourth facial image corresponding to the same person to obtain one facial image in the at least one fourth facial image with the quality reaching the first preset condition.

The duplicate removing and filtering unit is configured to perform a duplicate removing and filtering operation on the plurality of obtained facial images corresponding to different persons to obtain at least one facial image.

In an optional example of the embodiments of the apparatus for dynamically adding facial images into a database of the present disclosure, the facial angle includes one or more of the following: a facial yaw angle, a facial pitch angle, and a facial roll angle.

The filtering module includes an angle conversion module and a vector filtering module.

The angle conversion module is configured to convert the facial yaw angle, the facial pitch angle, and the facial roll angle corresponding to the facial image into a three-dimensional vector; and The vector filtering module is configured to filter the facial image in the facial trajectory based on the distance between the three-dimensional vector and a source point, the source point being a three-dimensional vector with all values equal to 0.

In an optional example of the embodiments of the apparatus for dynamically adding facial images into a database of the present disclosure, the matching module is According to one or more embodiments of the present disclosure configured to: obtain a similarity between at least one facial image and a facial image in the image queue based on facial features corresponding to the at least one facial image and facial features corresponding to the facial image in the image queue; and obtain, in response to the fact that the similarity is greater than or equal to a preset similarity, a matching result indicating that the facial image has a matched image in the image queue; and obtain, in response to the fact that the similarity is less than the preset similarity, a matching result indicating that the facial image has no matched image in the image queue.

According to another aspect of embodiments of the present disclosure, provided is an electronic device, including a processor, where the processor includes the apparatus for removing duplicated facial images according to any embodiment of the present disclosure.

According to another aspect of embodiments of the present disclosure, provided is an electronic device, including a memory configured to store executable instructions and a processor.

The processor is configured to communicate with the memory to execute the executable instructions to achieve operations of any embodiment of the method for removing duplicated facial images of the present disclosure According to another aspect of embodiments of the present disclosure, provided is a computer storage medium, configured to store computer-readable instructions, where in response to the instruction being executed, the operations of any embodiment of the method for removing duplicated facial images of the present disclosure are executed.

According to another aspect of embodiments of the present disclosure, provided is a computer program, including computer-readable codes, where when the computer-readable codes run in a device, a processor in the device executes instructions for implementing any embodiment of the method for removing duplicated facial images of the present disclosure.

Embodiments of the present disclosure further provide an electronic device, such as a mobile terminal, a Personal Computer (PC), a tablet computer, and a server. Referring to FIG. 3 below, a schematic structural diagram of an electronic device 300 suitable for implementing the terminal device or the server of the embodiments of the present disclosure is shown. As shown in FIG. 3, the electronic device 300 includes one or more processors, and a communication part, etc. The one or more processors are, for example, one or more Central Processing Units (CPUs) 301 and/or one or more Graphic Processing Units (GPUs) 313, and the processors may execute appropriate actions and processing according to executable instructions stored in a Read-Only Memory (ROM) 302 or executable instructions loaded from a storage section 308 to a Random Access Memory (RAM) 303. The communication part 312 may include, but is not limited to, a network card. The network card may include, but is not limited to, an InfiniBand (IB) network card.

The processor may communicate with the ROM 302 and/or the RAM 303 to execute the executable instructions, be connected to the communication part 312 by means of a communication bus 304, and communicate with other target devices via the communication part 312, thereby completing corresponding operations of any method provided by the embodiments of the present disclosure, such as, comparing the obtained facial image with the pre-stored facial image in the image database; and in response to a comparison result indicating that the facial image has no matched facial image in the image database, storing the facial image in the database, or not storing in the image database.

In addition, the RAM 303 may further store various programs and data required during an operation of the apparatus. The CPU 301, the ROM 302, and the RAM 303 are connected to each other via the bus 304. In the presence of the RAM 303, the ROM 302 is an optional module. The RAM 303 stores executable instructions, or writes executable instructions to the ROM 302 during running. The executable instructions cause the CPU 301 to execute the operations of the communication method. An Input/Output (I/O) interface 305 is also connected to the bus 304. The communication unit 312 is integrated, or is set as having a plurality of sub-modules (for example, a plurality of IB network cards) respectively connected to the bus.

The following components are connected to the I/O interface 305: an input section 306 including a keyboard, a mouse and the like; an output section 307 including a Cathode-Ray Tube (CRT), a Liquid Crystal Display (LCD), a loudspeaker and the like; a storage section 308 including a hard disk and the like; and a communication section 309 of a network interface card including an LAN card, a modem and the like. The communication section 309 performs communication processing via a network such as the Internet. A drive 310 is also connected to the I/O interface 305 according to needs. A removable medium 311 such as a magnetic disk, an optical disk, a magneto-optical disk, and a semiconductor memory is mounted on the drive 310 according to needs, so that a computer program read from the removable medium 311 is installed on the storage section 308 according to needs.

It should be noted that, the architecture shown in FIG. 3 is merely an optional implementation. During specific practice, a number and types of the components in FIG. 3 are selected, decreased, increased, or replaced according to actual needs. Different functional components are separated or integrated or the like. For example, the GPU 313 and the CPU 301 are separated, or the GPU 313 is integrated on the CPU 301, and the communication part is separated from or integrated on the CPU 301 or the GPU 313 or the like. These alternative implementations all fall within the scope of protection of the present disclosure.

Particularly, the process described above with reference to a flowchart according to embodiments of the present disclosure is implemented as a computer software program. For example, one or more embodiments of the present disclosure include a computer program product, which includes a computer program tangibly included in a machine-readable medium. The computer program includes program codes for executing the method shown in the flowchart, the program codes may include instructions for correspondingly executing operations of the method provided by the embodiments of the present disclosure, e.g., comparing the obtained facial image with the pre-stored facial image in the image database; and in response to a comparison result indicating that the facial image has no matched facial image in the image database, storing the facial image in the database, or not storing in the image database. In such embodiments, the computer program can be downloaded and installed from the network through the communication part 309, and/or is installed from the removable medium 311. When executed by the CPU 301, the computer program executes the foregoing function defined in the method of the present disclosure.

Various embodiments in this description are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and the apparatuses of the present disclosure are implemented in many manners. For example, the methods and apparatuses of the present disclosure are implemented by using software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure is implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for dynamically adding facial images into a database, performed by an electronic device, comprising:
comparing an obtained first facial image with pre-stored facial image information in an image database; and
in response to a comparison result indicating that the first facial image is not matched with any one piece of the pre-stored facial image information in the image database, determining whether to store at least one of the first facial image or feature information of the first facial image into the image database,
wherein the image database comprises at least one piece of the pre-stored facial image information and a number of occurrences corresponding to each piece of the pre-stored facial image information;
and the method further comprises:
in response to the comparison result indicating that the first facial image is matched with a piece of pre-stored facial image information in the image database, adding a number of occurrences corresponding to the matched pre-stored facial image information in the image database by 1, wherein the first facial image is not stored in the image database,
wherein before the comparing an obtained first facial image with pre-stored facial image information in an image database, the method further comprises:
performing a duplicate removing and filtering operation on a plurality of obtained facial images to obtain at least one facial image, the at least one facial image comprising the first facial image; or
receiving at least one facial image sent by a terminal device, wherein the at least one facial image is obtained by performing the duplicate removing and filtering operation on the plurality of obtained facial images by the terminal device, and the at least one facial image comprises the first facial image,
wherein before the performing a duplicate removing and filtering operation on a plurality of obtained facial images to obtain at least one facial image, the method further comprises:
recognizing at least one fourth facial image corresponding to a same person from the plurality of obtained fourth facial images; and
filtering, based on a facial angle in each of the plurality of obtained fourth facial image, the at least one fourth facial image corresponding to the same person to obtain, from the at least one fourth facial image, at least one facial image with the quality meeting the first preset condition,
wherein the facial angle comprises at least one of the following: a facial yaw angle, a facial pitch angle, or a facial roll angle;
and the filtering, based on a facial angle in each of the plurality of obtained fourth facial image, the at least one fourth facial image corresponding to the same person to obtain, from the at least one fourth facial image, at least one facial image with the quality meeting the first preset condition comprises:

converting the facial yaw angle, the facial pitch angle, and the facial roll angle corresponding to each of the at least one fourth facial image into a three-dimensional vector; and filtering, based on a distance between the three-dimensional vector and a source point, the at least one fourth facial image to obtain, from the at least one fourth facial image, the at least one facial image with the quality meeting the first preset condition, wherein the source point is a three-dimensional vector with all values equal to 0.

2. The method according to claim 1, wherein the determining whether to store at least one of the first facial image or feature information of the first facial image into the image database comprises:

determining, according to a preset mode, whether to store at least one of the first facial image or the feature information of the first facial image into the image database.

3. The method according to claim 1, wherein the determining whether to store at least one of the first facial image or the feature information of the first facial image into the image database comprises:

determining, according to obtained operation instruction information, whether to store at least one of the first facial image or the feature information of the first facial image into the image database.

4. The method according to claim 3, wherein before the determining, according to obtained operation instruction information, whether to store at least one of the first facial image and the feature information of the first facial image into the image database, the method further comprises:

sending prompt operation information; and
receiving the operation instruction information which is fed back according to the prompt operation information.

5. The method according to claim 4, further comprising:
in response to not receiving, within a preset time period, the operation instruction information which is fed back according to the prompt operation information, sending the prompt operation information repeatedly, or determining not to store at least one of the first facial image and the feature information of the first facial image in the image database.

6. The method according to claim 1, wherein the image database comprises at least one image group, and each of the at least one image group stores at least one second facial image of a same person and acquisition time and an acquisition location corresponding to each of the at least one second facial image;

and the method further comprises: in response to a number of occurrences corresponding to one piece of the pre-stored facial image information being greater than 2, establishing a behavior trajectory of a person corresponding to the one piece of pre-stored facial image information based on at least one second facial image in an image group, to which the one piece of pre-stored facial image information belongs, as well as acquisition time and an acquisition location of each of the at least one second facial image.

7. The method according to claim 1, wherein the image database comprises at least one image group, and each of the at least one image group is configured to store a plurality of second facial images of a same person;

and the comparing an obtained first facial image with pre-stored facial image information in an image database comprises: comparing the obtained first facial image with one of the plurality of second facial images in the at least one image group.

8. The method according to claim 1, wherein the performing a duplicate removing and filtering operation on a plurality of obtained facial images to obtain at least one facial image comprises:

matching a third facial image in the plurality of obtained facial images with at least one facial image in an image queue to obtain a matching result; and in response to the matching result indicating that the third facial image is matched with an image in the image queue, performing at least one of following operations: determining that the third facial image is a duplicate image, or not storing the third facial image into the image queue.

9. The method according to claim 8, further comprising:
in response to the matching result indicating that the third facial image is not matched with any one image in the image queue, performing at least one of following operations: determining that the third facial image is not a duplicate image, or adding the third facial image into the image queue.

10. The method according to claim 8, wherein the matching a third facial image in the plurality of obtained facial images with at least one facial image in an image queue to obtain a matching result comprises:

obtaining, based on facial features corresponding to the third facial image and facial features corresponding to each of the at least one facial image in the image queue, a similarity between the third facial image and the each of the at least one facial image in the image queue; and obtaining, based on the similarity between the third facial image and each facial image in the image queue, a matching result.

11. The method according to claim 1, wherein the performing a duplicate removing and filtering operation on a plurality of obtained facial images to obtain at least one facial image comprises:

performing a duplicate removing and filtering operation on the plurality of obtained facial images corresponding to different persons to obtain at least one facial image.

12. An electronic device, comprising:
a processor; and
a memory for storing instructions executable by the processor;
wherein execution of the instructions by the processor causes the processor to perform:
comparing an obtained first facial image with pre-stored facial image information in an image database; and
in response to a comparison result indicating that the first facial image has no matched pre-stored facial image information in the image database, determining whether to store at least one of the first facial image or feature information of the first facial image into the image database,
wherein the image database comprises at least one piece of the pre-stored facial image information and a number of occurrences corresponding to each piece of the pre-stored facial image information;
and execution of the instructions by the processor causes the processor to further perform:
in response to the comparison result indicating that the first facial image is matched with a piece of pre-stored facial image information in the image database, adding a number of occurrences corresponding to the matched pre-stored facial image information in the image database by 1, wherein the first facial image is not stored in the image database, wherein before the comparing an obtained first facial image with pre-stored facial image information in an image database, the method further comprises:

performing a duplicate removing and filtering operation on a plurality of obtained facial images to obtain at least one facial image, the at least one facial image comprising the first facial image; or receiving at least one facial image sent by a terminal device, wherein the at least one facial image is obtained by performing the duplicate removing and filtering operation on the plurality of obtained facial images by the terminal device, and the at least one facial image comprises the first facial image, wherein before the performing a duplicate removing and filtering operation on a plurality of obtained facial images to obtain at least one facial image, the method further comprises:

recognizing at least one fourth facial image corresponding to a same person from the plurality of obtained fourth facial images; and filtering, based on a facial angle in each of the plurality of obtained fourth facial image, the at least one fourth facial image corresponding to the same person to obtain, from the at least one fourth facial image, at least one facial image with the quality meeting the first preset condition, wherein the facial angle comprises at least one of the following: a facial yaw angle, a facial pitch angle, or a facial roll angle;

and the filtering, based on a facial angle in each of the plurality of obtained fourth facial image, the at least one fourth facial image corresponding to the same person to obtain, from the at least one fourth facial image, at least one facial image with the quality meeting the first preset condition comprises:

converting the facial yaw angle, the facial pitch angle, and the facial roll angle corresponding to each of the at least one fourth facial image into a three-dimensional vector; and filtering, based on a distance between the three-dimensional vector and a source point, the at least one fourth facial image to obtain, from the at least one fourth facial image, the at least one facial image with the quality meeting the first preset condition, wherein the source point is a three-dimensional vector with all values equal to 0.

13. A non-transitory computer storage medium, configured to store computer-readable instructions, wherein execution of the instructions by the processor causes the processor to perform:

comparing an obtained first facial image with pre-stored facial image information in an image database; and in response to a comparison result indicating that the first facial image has no matched pre-stored facial image information in the image database, determining whether to store at least one of the first facial image or feature information of the first facial image into the image database, wherein the image database comprises at least one piece of the pre-stored facial image information and a number of occurrences corresponding to each piece of the pre-stored facial image information;

and execution of the instructions by the processor causes the processor to further perform:

in response to the comparison result indicating that the first facial image is matched with a piece of pre-stored facial image information in the image database, adding a number of occurrences corresponding to the matched pre-stored facial image information in the image database by 1, wherein the first facial image is not stored in the image database, wherein before the comparing an obtained first facial image with pre-stored facial image information in an image database, the method further comprises:

performing a duplicate removing and filtering operation on a plurality of obtained facial images to obtain at least one facial image, the at least one facial image comprising the first facial image; or receiving at least one facial image sent by a terminal device, wherein the at least one facial image is obtained by performing the duplicate removing and filtering operation on the plurality of obtained facial images by the terminal device, and the at least one facial image comprises the first facial image, wherein before the performing a duplicate removing and filtering operation on a plurality of obtained facial images to obtain at least one facial image, the method further comprises:

recognizing at least one fourth facial image corresponding to a same person from the plurality of obtained fourth facial images; and filtering, based on a facial angle in each of the plurality of obtained fourth facial image, the at least one fourth facial image corresponding to the same person to obtain, from the at least one fourth facial image, at least one facial image with the quality meeting the first preset condition, wherein the facial angle comprises at least one of the following: a facial yaw angle, a facial pitch angle, or a facial roll angle;

and the filtering, based on a facial angle in each of the plurality of obtained fourth facial image, the at least one fourth facial image corresponding to the same person to obtain, from the at least one fourth facial image, at least one facial image with the quality meeting the first preset condition comprises:

converting the facial yaw angle, the facial pitch angle, and the facial roll angle corresponding to each of the at least one fourth facial image into a three-dimensional vector; and filtering, based on a distance between the three-dimensional vector and a source point, the at least one fourth facial image to obtain, from the at least one fourth facial image, the at least one facial image with the quality meeting the first preset condition, wherein the source point is a three-dimensional vector with all values equal to 0.

14. The method according to claim 2, wherein the preset mode comprises:

a first preset mode of storing at least one of the first facial image and the feature information of the first facial image, that has no matched pre-stored facial image information, in the image database; or a second preset mode of not storing at least one of the first facial image and the feature information of the first facial image, that has no matched pre-stored facial image information, in the image database.

* * * * *